United States Patent
Konishi et al.

(10) Patent No.: US 8,496,742 B2
(45) Date of Patent: Jul. 30, 2013

(54) WET FLUE-GAS DESULFURIZATION EQUIPMENT

(75) Inventors: Tomoyuki Konishi, Hiroshima (JP); Takanori Nakamoto, Hiroshima (JP); Kouji Muramoto, Hiroshima (JP); Hiroyuki Nosaka, Hiroshima (JP); Atsushi Katagawa, Hiroshima (JP); Takuro Ueda, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 187 days.

(21) Appl. No.: 12/519,551

(22) PCT Filed: Sep. 19, 2007

(86) PCT No.: PCT/JP2007/068170
§ 371 (c)(1),
(2), (4) Date: Jun. 17, 2009

(87) PCT Pub. No.: WO2008/087769
PCT Pub. Date: Jul. 24, 2008

(65) Prior Publication Data
US 2010/0077925 A1   Apr. 1, 2010

(30) Foreign Application Priority Data
Jan. 17, 2007   (JP) .................... 2007-007913

(51) Int. Cl.
*B01D 53/14*   (2006.01)
(52) U.S. Cl.
USPC .......................................................... 96/322

(58) Field of Classification Search
USPC ................................................... 96/322, 243
See application file for complete search history.

(56) References Cited

U.S. PATENT DOCUMENTS 3,907,526 A * 9/1975 Saleem et al. ................... 96/233
4,687,649 A * 8/1987 Kuroda et al. ........... 423/243.03
(Continued)

FOREIGN PATENT DOCUMENTS

| JP | 56-54929 | | 5/1981 |
| JP | 61185316 | * | 8/1986 |

(Continued)

OTHER PUBLICATIONS

English language Abstract of JP 11-506975, Jun. 22, 1999.
(Continued)

*Primary Examiner* — Robert A Hopkins
(74) *Attorney, Agent, or Firm* — Greenblum & Bernstein P.L.C.

(57) ABSTRACT

In an absorbing tower including an absorption unit of relatively small diameter capable of absorption and removal by an absorbent slurry for exhaust gas purification and a tank unit of relatively large diameter for temporarily storing the absorbent slurry flowing down from the absorption unit, the tank unit and the absorption unit are joined together by a conical member. By disposing an entrance flue at the conical member, a distance from an upper portion of the conical member to a spray header is shortened, and a height of the absorbing tower can be reduced accordingly. By extending a front end of the entrance flue to the absorption unit into which droplets of the absorbent slurry fall, a high-temperature exhaust gas from a boiler, etc., that has passed through the entrance flue, is made to pass through a circumference of the conical member so that an inexpensive material can be used in the conical member.

15 Claims, 7 Drawing Sheets

U.S. PATENT DOCUMENTS

| | | | |
|---|---|---|---|
| 5,421,861 A | * | 6/1995 | Gohara et al. ............... 95/235 |
| 5,512,072 A | | 4/1996 | Laslo |
| 5,656,046 A | * | 8/1997 | Gohara et al. ............... 96/273 |
| 5,690,899 A | * | 11/1997 | Makkinejad et al. .... 423/243.01 |
| 6,488,899 B1 | | 12/2002 | Gohara et al. |
| 2009/0173234 A1 | | 7/2009 | Ueda et al. |

FOREIGN PATENT DOCUMENTS

| | | | |
|---|---|---|---|
| JP | 5-293333 | | 11/1993 |
| JP | 8-290037 | | 11/1996 |
| JP | 11-506975 | | 6/1999 |
| JP | 2002-502693 | | 1/2002 |
| JP | 2003181241 | * | 7/2003 |
| JP | 3549484 | | 4/2004 |

OTHER PUBLICATIONS

English language Abstract of JP 8-290037, Nov. 5, 1996.
English language Abstract of JP 3549484, Apr. 30, 2004.
English language Abstract of JP 2002-502693, Jan. 29, 2002.
English language Abstract of JP 5-293333, Nov. 9, 1993.
Japan Official Action, mail date is Nov. 20, 2012 and partial English language translation thereof.

* cited by examiner

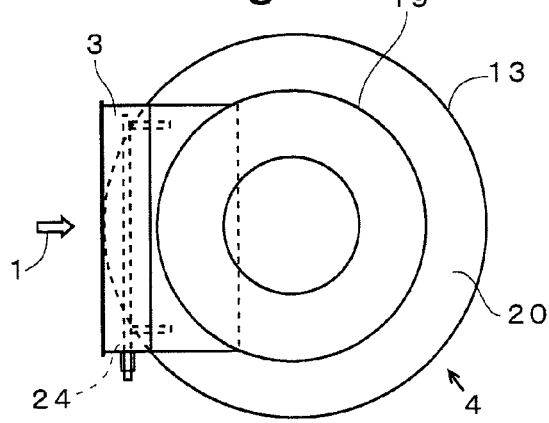
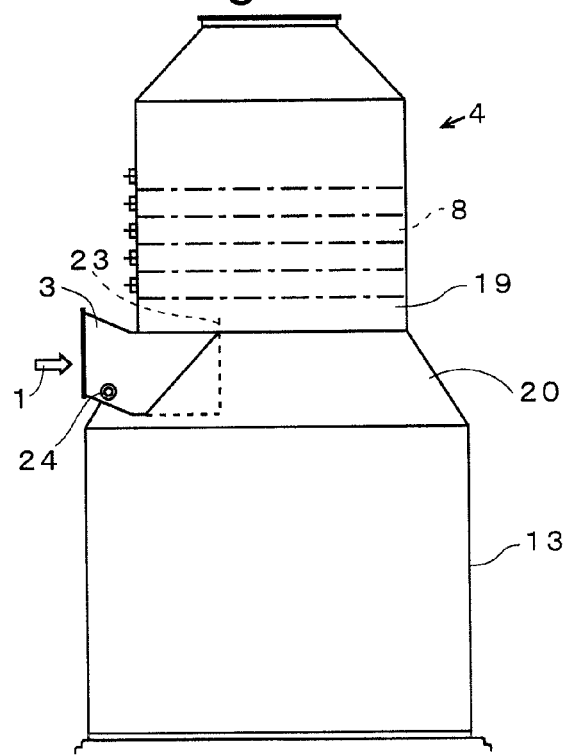
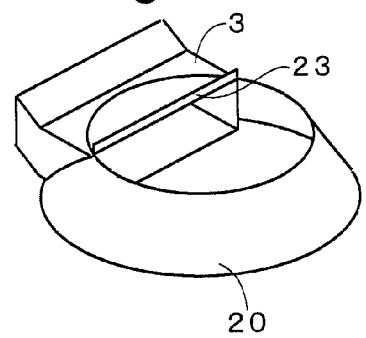

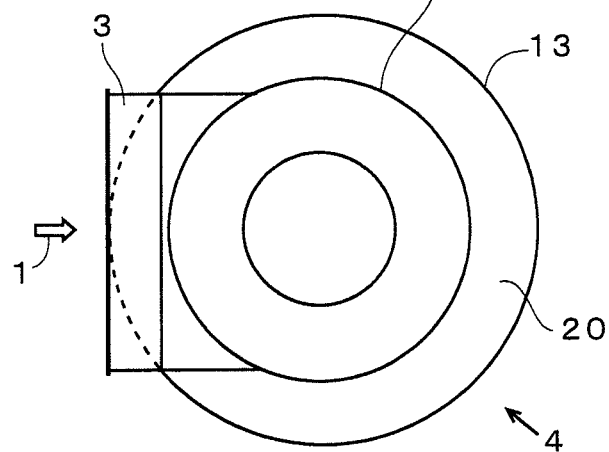
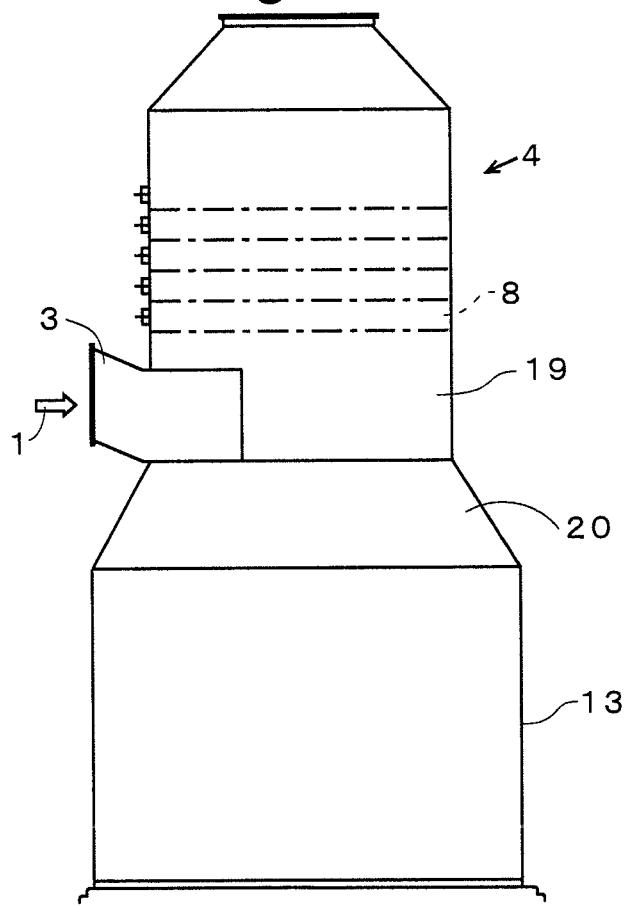

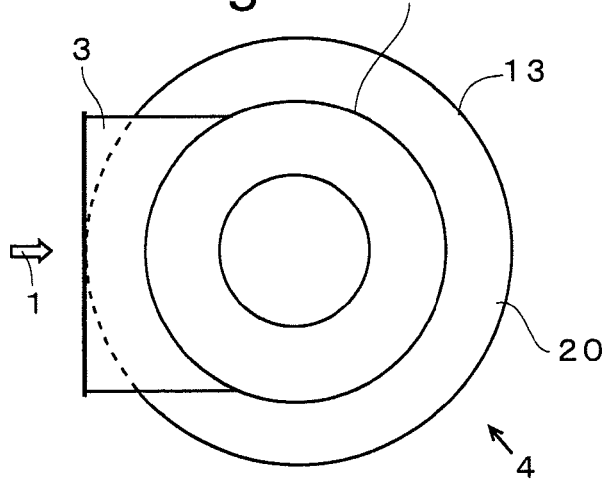
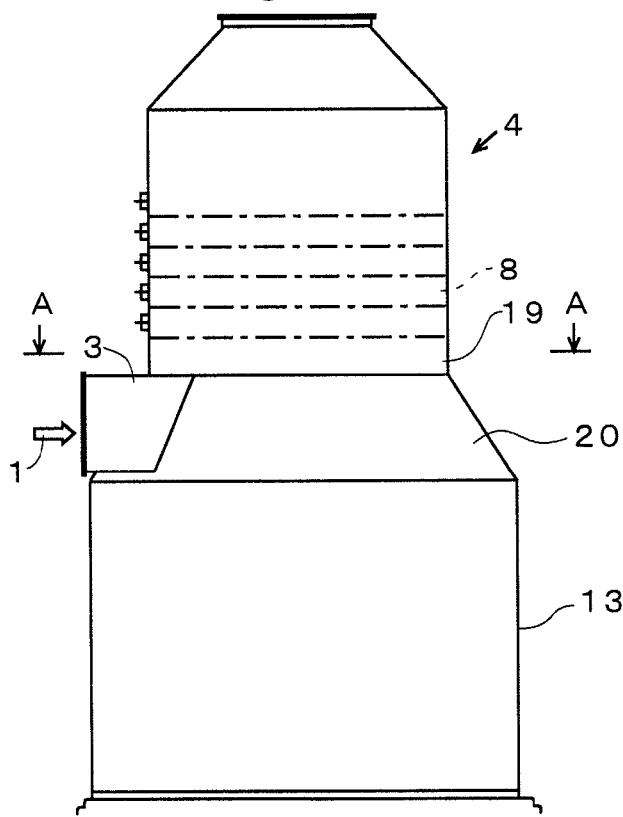
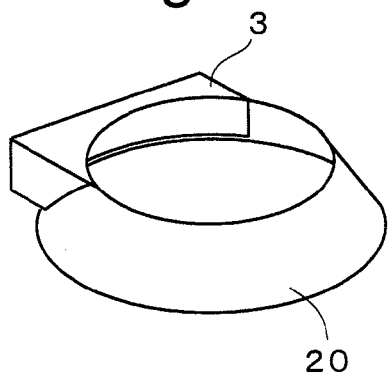

WET FLUE-GAS DESULFURIZATION EQUIPMENT

TECHNICAL FIELD

The present invention relates to an absorbing apparatus, particularly to a wet flue-gas desulfurization equipment for lessening sulfur oxides (SOx), soot/dust, and boiler fuel components and substances in an exhaust gas.

BACKGROUND ART

As an equipment for removing sulfur oxides from combustion exhaust gas to prevent air pollution, a wet-type limestone-gypsum desulfurization equipment is being put to practical use widely. A system of this desulfurization equipment is shown in FIG. 7. An exhaust gas 1 from a boiler, etc., is introduced from a gas entrance flue 3 into an absorbing tower 4, and by the exhaust gas 1 coming into contact with droplets of an absorbing liquid sprayed from a plurality of spray nozzles 8a disposed in each of spray headers 8 installed in multiple stages in a gas flowing direction inside the absorbing tower 4, SOx in the exhaust gas 1 are absorbed, along with soot/dust, hydrogen chloride (HCl), hydrogen fluoride (HF), and other acidic gases in the exhaust gas 1, at droplet surfaces. A mist entrained in the exhaust gas 1 is eliminated by a mist eliminator 5 installed at an exit of an absorbing tower 4, and a clean exhaust gas 2 is emitted from a chimney via an exit flue 6 and upon being reheated if necessary. A SOx concentration in the exhaust gas 1 flowing through the entrance flue 3 of the absorbing tower 4 in this process is measured by an entrance SOx meter 41.

Limestone 16, which is a SOx absorbent, is kept in a limestone slurry tank 15, and the limestone slurry is supplied by a limestone slurry pump 17 to a reservoir 4a disposed at a lower portion inside the absorbing tower 4. An amount of the limestone slurry supplied to the absorbing tower 4 is adjusted by a limestone slurry flow control valve 18 according to a SOx absorption amount inside the absorbing tower 4.

The slurry-form absorbing liquid in the reservoir 4a inside the absorbing tower 4 is pressurized by an absorbing tower circulating pump 7 and supplied via a circulation piping 25 to the spray headers 8 disposed in multiple stages in the gas flow direction at an empty tower portion at an upper portion inside the absorbing tower 4. Each spray header 8 is provided with a plurality of spray nozzles 8a, and the absorbing liquid is sprayed from the spray nozzles 8a and put in gas-liquid contact with the exhaust gas 1. The SOx in the exhaust gas reacts with calcium compounds in the absorbing liquid and converted to calcium sulfite (including calcium bisulfite), which is an intermediate product, drops to the reservoir 4a of the absorbing tower 4, is oxidized to gypsum and thereby converted into a final product (gypsum) by air supplied by an oxidizing air blower 21 into the absorbing liquid of the absorbing tower 4.

By thus supplying air directly into the absorbing tower 4, the reaction of absorption of the SOx in the exhaust gas and the oxidization reaction of the calcium sulfite produced are made to proceed simultaneously to promote the overall reaction and improve desulfurization performance. In addition, the oxidizing air supplied to the absorbing tower 4 in this process is made into microscopic bubbles by an oxidizing agitator 26 that agitates the absorbing liquid inside the reservoir 4a to improve usage efficiency of the oxidizing air.

The absorbing liquid is thereafter extracted from the reservoir 4a by an extracting pump 9 in accordance with an amount of gypsum produced, and a portion thereof is fed to a pH meter tank 30 and a pH of the absorbing liquid is measured by a pH meter 31 installed in the pH meter tank 30. The remaining portion of the absorbing liquid is fed to a gypsum dehydration system 10 and recovered as powder gypsum 11.

Meanwhile, water 12, separated at the gypsum dehydration system 10, is reused inside the gypsum dehydration system as water supplied to the limestone slurry tank 15, etc., and a portion thereof is extracted as wastewater 14 for preventing concentration of chlorine, etc., and fed to a waste water treatment system 50. At the wastewater treatment system 50, a chemical process by addition of a chemical or treatment by an ion adsorption resin, etc., and a biological process by bacteria are performed to perform a process of eliminating hazardous substances in the wastewater 14 so that amounts of respective components in the wastewater 14 fall below emission standards.

Each of FIGS. 4 and 5 shows structural diagrams of the absorbing tower 4 and the entrance flue 3 according to the conventional art described above. FIGS. 4A and 5A are both plan views and FIGS. 4B and 5B are both side views.

The absorbing tower 4 has a configuration where a large-diameter tank unit 13 and a small-diameter absorption unit 19 are joined together by a conical member 20, and whereas with the example shown in FIG. 4, which is disclosed in U.S. Pat. No. 5,656,046, the entrance flue 3 is disposed at the small-diameter absorption unit 19, with the example shown in FIG. 5, which is disclosed in FIGS. 3 and 4 of Japanese Patent No. 3549484 and U.S. Pat. No. 6,488,899, the entrance flue 3 is disposed at the conical member 20 that joins the large-diameter tank unit 13 and the small-diameter absorption unit 19. In addition, FIG. 5C is a perspective view of just the conical member 20.

[Patent Document 1] U.S. Pat. No. 5,656,046
[Patent Document 2] Japanese Patent No. 3549484
[Patent Document 3] U.S. Pat. No. 6,488,899

DISCLOSURE OF THE INVENTION

Problems to be Solved by the Invention

In regard to the conventional arts, with the conventional art shown in FIG. 4 in which the entrance flue 3 is disposed at the small-diameter absorption unit 19, there is a problem that a height of the absorption unit 19 is made high by an amount corresponding to a height of the entrance flue 3.

In addition, in the case where the entrance flue 3 is disposed at the conical member 20 joining the large-diameter tank unit 13 and the small-diameter absorption unit 19 as shown in FIG. 5, because a high-temperature exhaust gas 1 from a boiler, etc., tends to flow along a circumference of the conical member 20 where droplets of the absorbent sprayed from the spray nozzles 8a (see FIG. 7) installed on the spray header 8 do not fall as shown in FIG. 6, which is a sectional view taken on line A-A of FIG. 5B, there is a problem that stringent material selection is required of the conical member 20 to meet conditions of the high-temperature exhaust gas 1 from the boiler, etc.

An object of the present invention is to provide a wet flue-gas desulfurization equipment, which includes an absorbing tower and with which, by design of an entrance flue installation portion, a height of the absorbing tower can be suppressed to a low height and an inexpensive material can be used as a component material of the absorbing tower.

Means for Solving the Problems

The above object of the present invention is achieved by the following solution means.

A first aspect of the present invention provides a wet flue-gas desulfurization equipment including an absorbing tower, in turn including: an absorption unit, using an absorbent slurry to absorb and remove soot/dust, sulfur oxides, and substances attributable to boiler fuel components that are contained in an exhaust gas emitted from a combustion apparatus; and a tank unit, temporarily storing the absorbent slurry flowing down from the absorption unit; and where the absorbing tower has a configuration such that the tank unit is large in diameter in compared to the absorption unit, the absorption unit is small in diameter in compared to the tank unit, and the tank unit and the absorption unit are joined together by a conical member, made up of a conical shell, an entrance flue for the exhaust gas is penetrated through the conical member, and a front end of the entrance flue is extended to a region in which the absorbent slurry falls from the absorption unit.

By disposing the entrance flue at the conical member, a distance from an upper portion of the conical member to a spray header is made short to enable the absorbing tower to be made low in height, and because by extending the front end of the entrance flue to the absorption unit at which droplets of the absorbent slurry fall, a high-temperature exhaust gas from a boiler, etc., that has passed through the entrance flue is made to directly contact the droplets of the absorbent slurry sprayed from spray nozzles installed on the spray header without passing along a circumference of the conical member and the gas is thus lowered in temperature, a need to select an expensive material, meeting conditions of the high-temperature exhaust gas from the boiler, etc., for the conical member is eliminated and selection of an inexpensive material, such as a lining, etc., that cannot be used at a high temperature is enabled.

A second aspect of the present invention provides the wet flue-gas desulfurization equipment according to the first aspect, where an insertion inclination angle of the absorbing tower gas entrance flue with respect to the conical member is inclined downward from above and is in a range of 10 to 30° with respect to the horizontal.

A third aspect of the present invention provides the wet flue-gas desulfurization equipment according to the first aspect, where an insertion inclination angle of the absorbing tower gas entrance flue with respect to the conical member is 0° with respect to the horizontal and a water washing apparatus is disposed at an inner wall bottom surface of the entrance flue.

A fourth aspect of the present invention provides the wet flue-gas desulfurization equipment according to the first aspects, where a trough, by which the absorbent slurry that flows down along an inner wall surface of the absorbing tower is prevented from flowing into an opening at the front end of the gas entrance flue, is disposed at a portion above the opening at the front end of the gas entrance flue.

A fifth aspect of the present invention provides the wet flue-gas desulfurization equipment according to the first aspects, where a baffle plate, by which the absorbent slurry that falls on an outer wall surface of the gas entrance flue at the inner wall side of the absorbing tower, is prevented from flowing into the opening at the front end of the gas entrance flue, is disposed on an outer wall surface of the opening.

As the absorbent slurry of the present invention, not only limestone, but a slurry of lime, etc., may also be used.

Effects of the Invention

With the first aspect of the present invention, reduction of material is enabled by lowering the height of the absorbing tower, and a power consumption reducing effect can be provided by lowering the height from the absorbing tower circulating pump to the spray header. Further, because the high-temperature exhaust gas from the boiler, etc., does not directly contact the conical member, an inexpensive lining material or other material that cannot be used under high temperature can be used.

With the second aspect of the present invention, in addition to the effects of the first aspect of the present invention, deposition of solids onto the entrance flue can be prevented because the absorbent slurry that has flowed in reverse into the entrance flue falls by gravity into the tank unit.

With the third aspect of the present invention, in addition to the effects of the first aspect of the present invention, by the insertion inclination angle of the absorbing tower gas entrance flue with respect to the conical member being made 0° with respect to the horizontal, a larger distance can be secured between a liquid level of the tank unit to a lower surface of the entrance flue and the tank unit can thus be kept low. Further, deposition of solids onto the entrance flue due to the absorbent slurry that has flowed in reverse into the entrance flue can be prevented by the washing equipment disposed at the inner wall bottom surface of the entrance flue.

With the fourth aspect of the present invention, in addition to the effects of the first aspects of the present invention, because the trough makes the absorbent slurry, flowing down along the inner wall surface, flow from the entrance flue outer wall surface to wall portions at both sides without flowing into the opening at the front end of the gas entrance flue, a flow of gas flowing into the absorbing tower from the gas entrance flue is not obstructed and pressure loss can thus be reduced.

With the fifth aspect of the present invention, in addition to the effects of the first aspects of the present invention, because the absorbent slurry, falling on the outer wall surface of the gas entrance flue at the inner wall side of the absorbing tower, flows from the entrance flue outer wall surface to the wall parts at both sides without flowing into the opening at the front end of the gas entrance flue, the flow of gas flowing into the absorbing tower from the gas entrance flue is not obstructed and pressure loss can thus be reduced.

BRIEF DESCRIPTION OF THE DRAWINGS

FIG. 3 shows structural diagrams of an absorbing tower of a wet desulfurization equipment according to an embodiment of the present invention (with FIG. 3A being a plan view, FIG. 3B being a side view, and FIG. 3C being a perspective view of just a conical member).

FIG. 4 shows structural diagrams of an absorbing tower of a conventional wet desulfurization equipment (with FIG. 4A being a plan view and FIG. 4B being a side view).

FIG. 5 shows structural diagrams of an absorbing tower of a conventional wet desulfurization equipment (with FIG. 5A being a plan view, FIG. 5B being a side view, and FIG. 5C being a perspective view of just a conical member).

BEST MODES FOR CARRYING OUT THE INVENTION

Figure 1A:
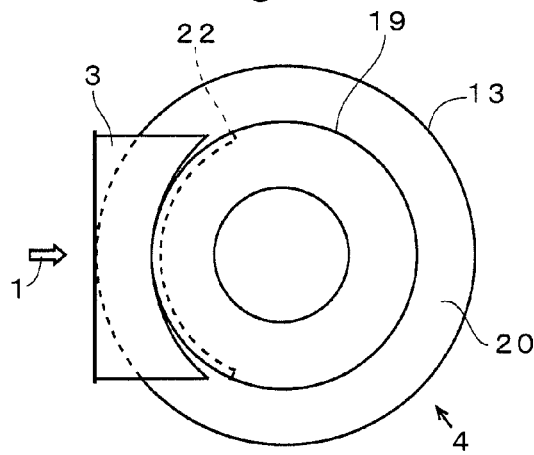
FIG. 1 shows structural diagrams of an absorbing tower of a wet desulfurization equipment according to an embodiment of the present invention (with FIG. 1A being a plan view, FIG. 1B being a side view, and FIG. 1C being a perspective view of just a conical member).
Figure 1B:
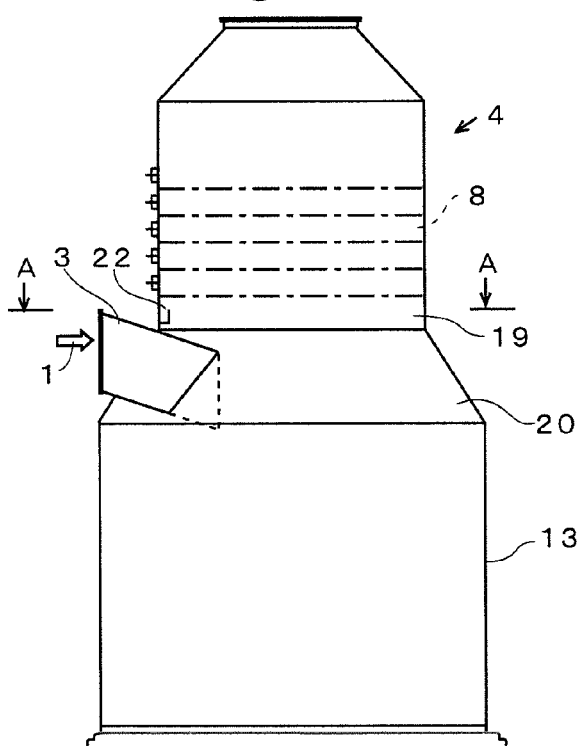
Figure 1C:
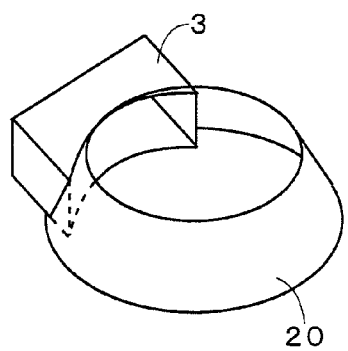
Figure 2:
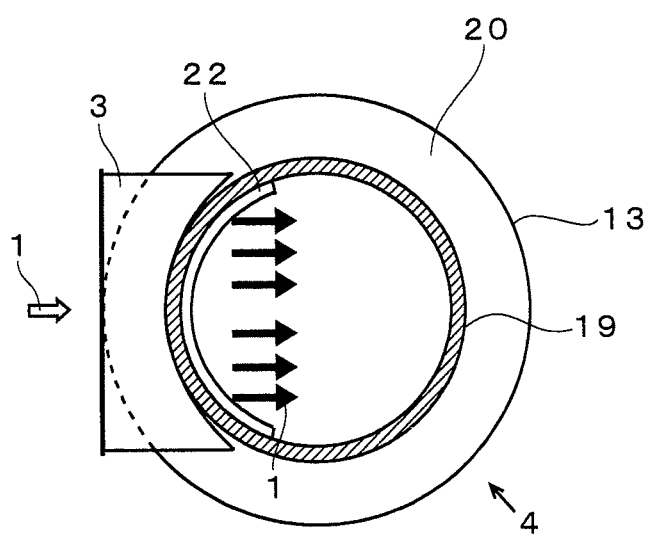
FIG. 2 is a sectional view taken online A-A of the plan view of an entrance flue of the absorbing tower of the wet desulfurization equipment according to the embodiment of the present invention.
Figure 6:
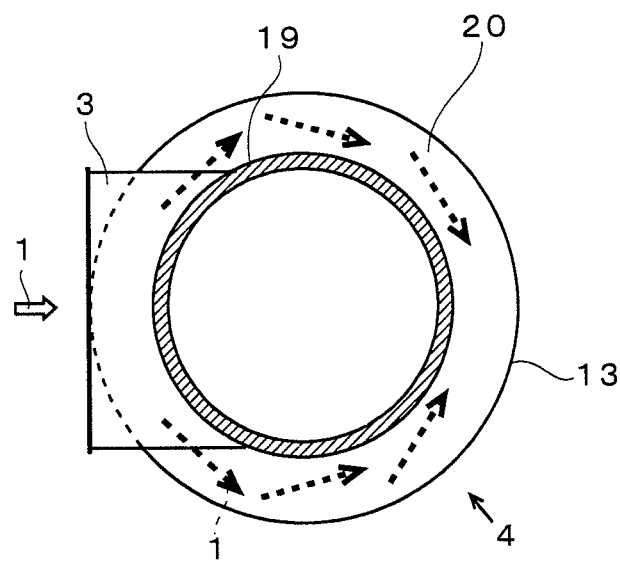
FIG. 6 is a sectional view taken online A-A of the plan view of an entrance flue of the absorbing tower of the wet desulfurization equipment of FIG. 5.

FIG. 1 shows structural diagrams of an absorbing tower of a wet desulfurization equipment according to an embodiment (with FIG. 1A being a plan view, FIG. 1B being a side view, and FIG. 1C being a perspective view of just a conical member). In addition, a gas flow of an exhaust gas 1 from a boiler, etc., into the absorbing tower 4 is shown in FIG. 2.

With respect to the absorbing tower 4, made up of a large-diameter tank unit 13, a small-diameter absorption unit 19, and the conical member 20, joining the tank 13 and the absorption unit 19, an entrance flue 3, with a certain inclination angle, is mounted on the conical member 20. A front end of the entrance flue 3 is extended to a position of the absorption unit 19 where droplets of an absorbent slurry flow down from a spray header 8 and is made to have a shape that is matched with an inner side of a side wall of the absorption unit 19. Also, a trough 22 is disposed at the inner side of the side wall of the absorption unit 19 at the entrance flue 3 side and below the spray header 8.

By disposing the entrance flue 3 at the conical member 20 that joins together the large-diameter tank unit 13 and the small-diameter absorption unit 19, a height of the absorbing tower 4 can be kept low by just an amount corresponding to a height of the entrance flue 3 in comparison to a case of disposing the entrance flue 3 at the absorption unit 19, and by making the entrance flue 3 have an inclination angle that is inclined downward with respect to the horizontal, the absorbent slurry that has flowed in reverse into an interior of the entrance flue 3 falls by gravity into the tank unit 13, thereby enabling prevention of deposition of solids onto an inner wall surface of the entrance flue 3. It is preferable to make an insertion inclination angle of the entrance flue 3 with respect to the conical member 20 incline downward from above and be in a range of 10 to 30° with respect to the horizontal because the absorbent slurry then falls by gravity into the tank unit 13.

Figure 7:
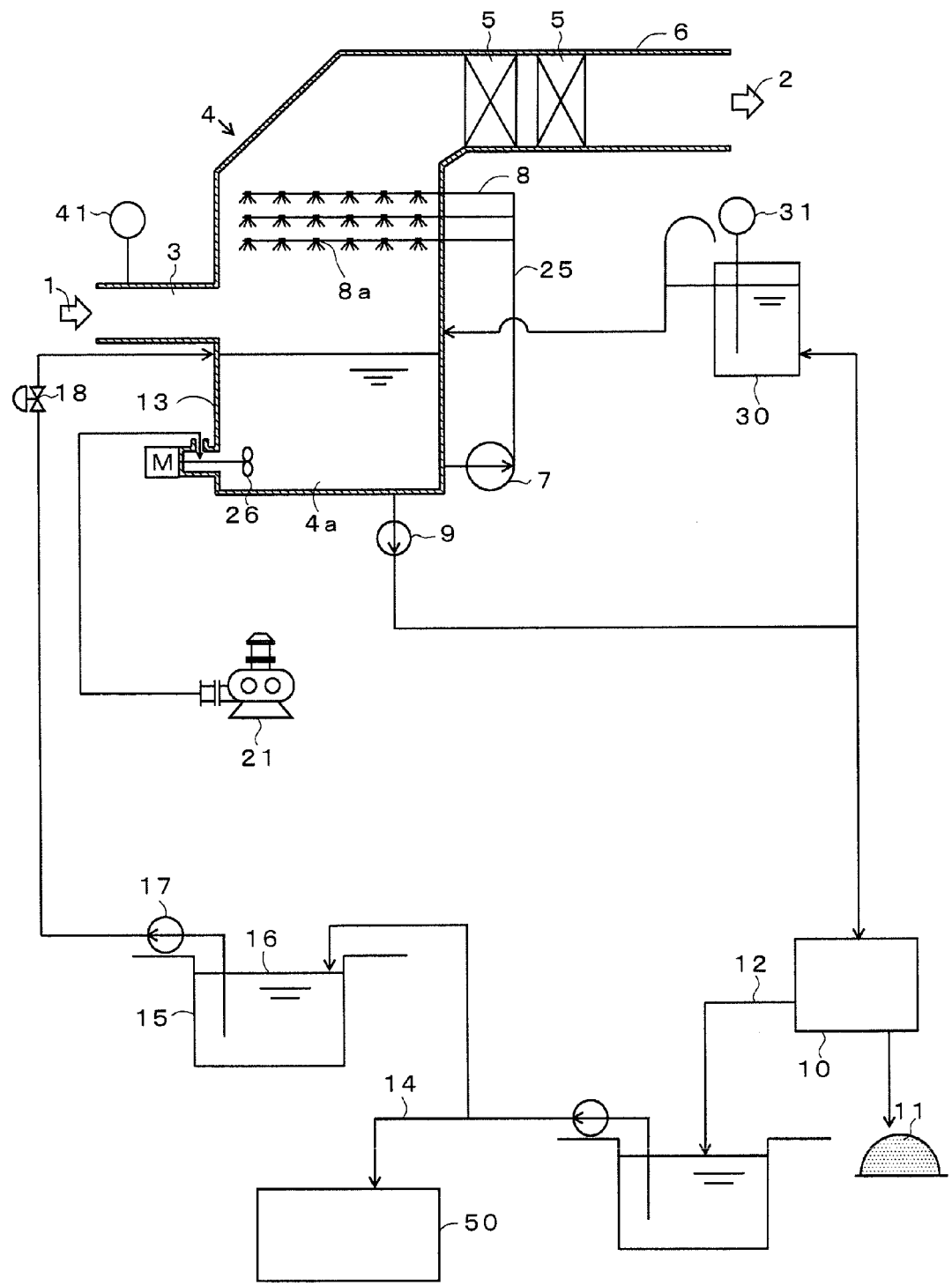
FIG. 7 is a diagram of a system of a conventional wet desulfurization equipment.

Further, by extending the front end of the entrance flue 3 to an internal portion of the absorption unit 19 where droplets of the absorbent fall, the conical member 20, at which the droplets of the absorbent slurry do not fall, does not become high in temperature because the high-temperature exhaust gas 1 from the boiler, etc., is made to immediately contact the droplets of the absorbent slurry at an exit of the entrance flue 3, as shown in FIG. 2A that is a sectional view taken on line A-A of FIG. 1B, without passing through a portion at a circumference of the conical member 20 where the droplets of the absorbent sprayed from spray nozzles 8a (see FIG. 7), installed on the spray header 8, do not fall, and the temperature of the exhaust gas 1 is thus lowered. Because a material having corrosion resistance under a low temperature condition, etc., can thus be selected for the conical member 20, a lining or other inexpensive material that cannot be used at a high temperature, such as that of the exhaust gas 1 from the boiler, etc., can be used.

Furthermore, because the trough 22 is disposed on the absorbing tower 4 inner wall surface above the entrance flue 3, the absorption unit slurry liquid that flows along the inner wall surface of the absorption unit 19 does not flow to the front end exit side of the entrance flue 3 and therefore does not obstruct the gas flow. Further, because the slurry is made to flow towards both sides of the outer wall of the entrance flue 3 by the trough 22, pressure loss can be reduced.

Another embodiment of the present invention is shown in FIG. 3. FIG. 3A is a structural diagram of an absorbing tower of a wet desulfurization equipment, FIG. 3B is a side view thereof, and FIG. 3C is a perspective view of the just a conical member thereof.

With the present embodiment, the entrance flue 3 is inserted from a horizontal direction into the conical member 20, the front end thereof is protruded into the interior of the absorbing tower 4, a baffle plate 23 is disposed at an upper portion of a front end outer wall surface of the entrance flue 3, and a washing piping, supplying washing water to a bottom surface that is an inner wall portion of the entrance flue 3, is provided. As effects of the present embodiment, because by making the entrance flue 3 horizontal, a larger distance can be secured between a liquid level of the tank unit 13 and a lower surface of the entrance flue 3, the tank unit 13 can be kept low, and because by the baffle plate 23, the absorption liquid flowing along the side wall of the absorption unit 19 and the upper portion of the entrance flue 3 can be made to flow to both ends of the entrance flue 3, the gas flow is not obstructed and the pressure loss can be reduced. Further, deposition of solids due to the absorbent slurry that has flowed in reverse into the entrance flue 3 can be prevented by the provision of a washing equipment 24.

INDUSTRIAL APPLICABILITY

Because an absorbing tower can be suppressed in height and be made to have a tower wall structure made of an inexpensive material, applicability to future flue gas desulfurization plants is high.

[Description of Symbols]

| | | | |
|---|---|---|---|
| 1 | exhaust gas from a boiler, etc. | 2 | clean exhaust gas |
| 3 | entrance flue | 4 | absorbing tower |
| 4a | reservoir | 5 | mist eliminator |
| 6 | exit flue | 7 | absorbing tower circulating pump |
| 8 | spray header | 8a | spray nozzle |
| 9 | extracting pump | 10 | gypsum dewatering system |
| 11 | gypsum | 12 | water |
| 13 | tank unit | 14 | wastewater |
| 15 | limestone slurry tank | 16 | limestone |
| 17 | limestone slurry pump | 18 | limestone slurry flow control valve |
| 19 | absorption unit | 20 | conical member |
| 21 | oxidizing air blower | 22 | trough |
| 23 | baffle plate | 24 | washing equipment |
| 25 | circulation piping | 26 | oxidizing agitator |
| 30 | pH meter tank | 31 | pH meter |
| 41 | entrance SOx meter | 50 | wastewater treatment system |

What is claimed is:

1. A wet flue-gas desulfurization equipment having an absorbing tower, the absorbing tower comprising:
    an absorption unit configured to use an absorbent slurry to absorb and remove soot/dust, sulfur oxides, and substances attributable to boiler fuel components that are contained in an exhaust gas emitted from a combustion apparatus;
    a tank unit configured to temporarily store the absorbent slurry flowing down from the absorption unit, wherein a diameter of the tank unit is larger than a diameter of the absorption unit, and the tank unit and the absorption unit are joined together by a conical member, the conical member comprising a conical shell; and an entrance flue having an opening at a front end and configured to allow passage of the exhaust gas, the front end of the entrance flue being defined by at least opposing vertically extending sidewalls, the entrance flue penetrating an outer surface of the conical member and the vertically extending sidewalls of the front end of the entrance flue extending to a region in which the absorbent slurry falls from the absorption unit.

2. The wet flue-gas desulfurization equipment according to claim 1, wherein an insertion inclination angle of the entrance flue with respect to the conical member is inclined downward from above and is in a range of 10 to 30° with respect to the horizontal.

3. The wet flue-gas desulfurization equipment according to claim 1, wherein an insertion inclination angle of the entrance flue with respect to the conical member is 0° with respect to the horizontal and a water washing apparatus is disposed at an inner wall bottom surface of the entrance flue.

4. The wet flue-gas desulfurization equipment according to claim 1, wherein the upper end of the conical member abuts a lower end of the absorption unit and a lower end of the conical member abuts an upper end of the tank.

5. The wet flue-gas desulfurization equipment according to claim 1, further comprising a trough provided on an inner wall surface of the absorption unit at a position above the opening of the entrance flue, with respect to a vertical direction, so as to prevent absorbent slurry flowing along the inner wall surface of the absorption unit, from flowing into the opening at the front end of the entrance flue, wherein a curvature of the trough conforms to a curvature of an opening in an upper end of the conical member.

6. The wet flue-gas desulfurization equipment according to claim 5, wherein an insertion inclination angle of the entrance flue with respect to the conical member is inclined downward from above and is in a range of 10 to 30° with respect to the horizontal.

7. The wet flue-gas desulfurization equipment according to claim 5, wherein an insertion inclination angle of the entrance flue with respect to the conical member is 0° with respect to the horizontal and a water washing apparatus is disposed at an inner wall bottom surface of the entrance flue.

8. The wet flue-gas desulfurization equipment according to claim 5, wherein the upper end of the conical member abuts a lower end of the absorption unit and a lower end of the conical member abuts an upper end of the tank.

9. The wet flue-gas desulfurization equipment according to claim 5, wherein a single trough is provided on the inner wall surface of the absorption unit.

10. The wet flue-gas desulfurization equipment according to claim 1, further comprising a baffle plate provided on an outer wall surface at the opening of the entrance flue so as to prevent the falling absorbent slurry from flowing into the opening at the front end of the entrance flue, wherein the baffle plate extends across an opening in an upper end of the conical member so as to intersect a circumference of the opening in the upper end of the conical member at two points.

11. The wet flue-gas desulfurization equipment according to claim 10, wherein an insertion inclination angle of the entrance flue with respect to the conical member is inclined downward from above and is in a range of 10 to 30° with respect to the horizontal.

12. The wet flue-gas desulfurization equipment according to claim 10, wherein an insertion inclination angle of the entrance flue with respect to the conical member is 0° with respect to the horizontal and a water washing apparatus is disposed at an inner wall bottom surface of the entrance flue.

13. The wet flue-gas desulfurization equipment according to claim 10, wherein the upper end of the conical member abuts a lower end of the absorption unit and a lower end of the conical member abuts an upper end of the tank.

14. The wet flue-gas desulfurization equipment according to claim 10, wherein a single baffle plate is provided on the outer wall surface at the opening of the entrance flue.

15. The wet flue-gas desulfurization equipment according to claim 1, the front end of the entrance flue is further defined by at least opposing horizontally extending sidewalls extending to the region in which the absorbent slurry falls from the absorption unit.

* * * * *